United States Patent Office 3,153,357
Patented Oct. 20, 1964

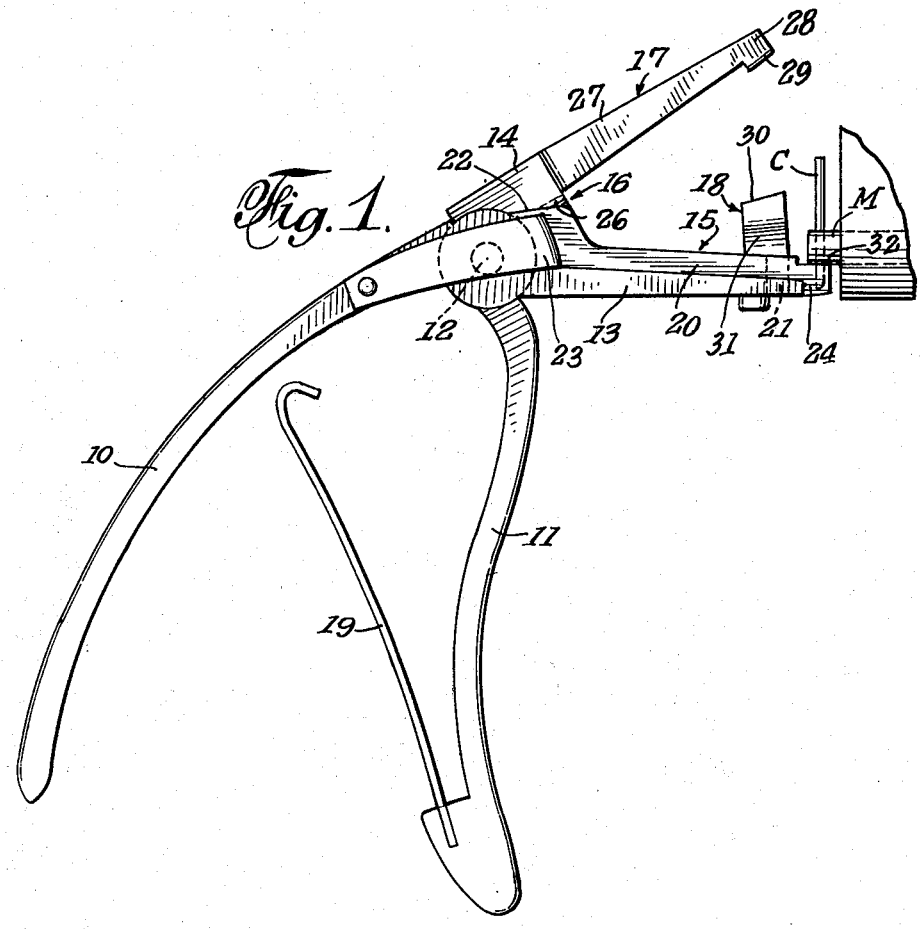
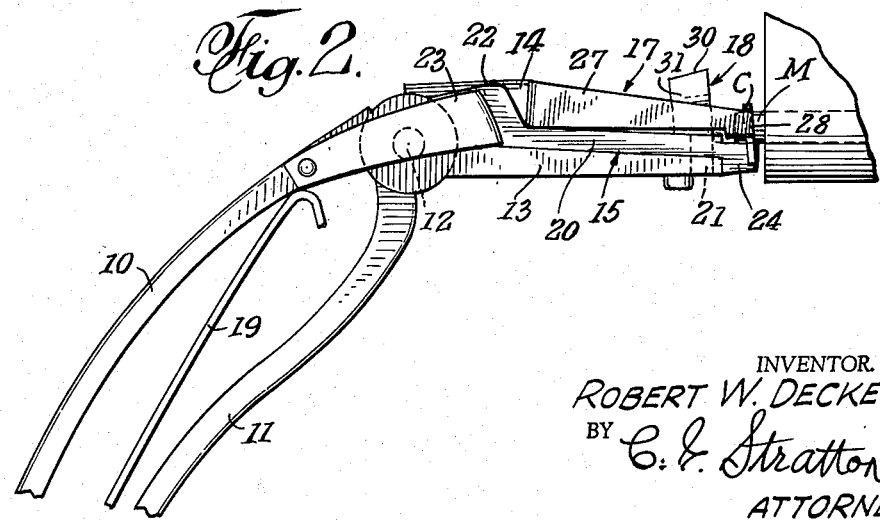

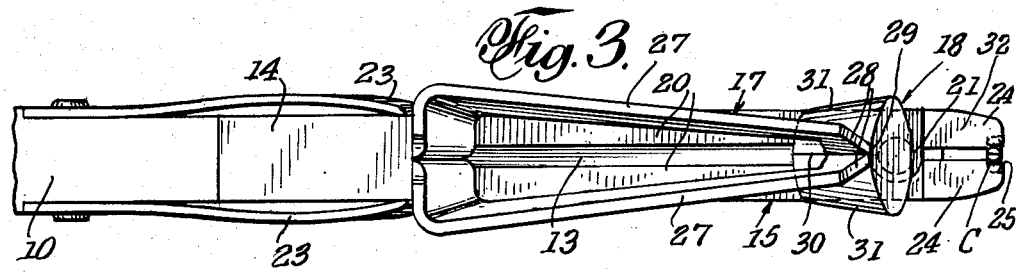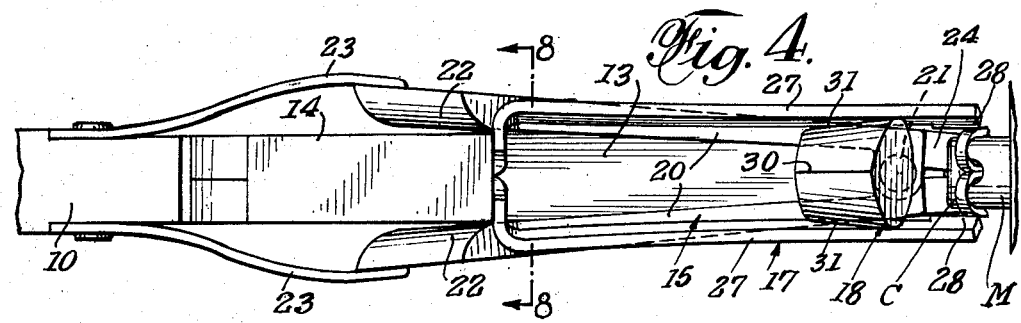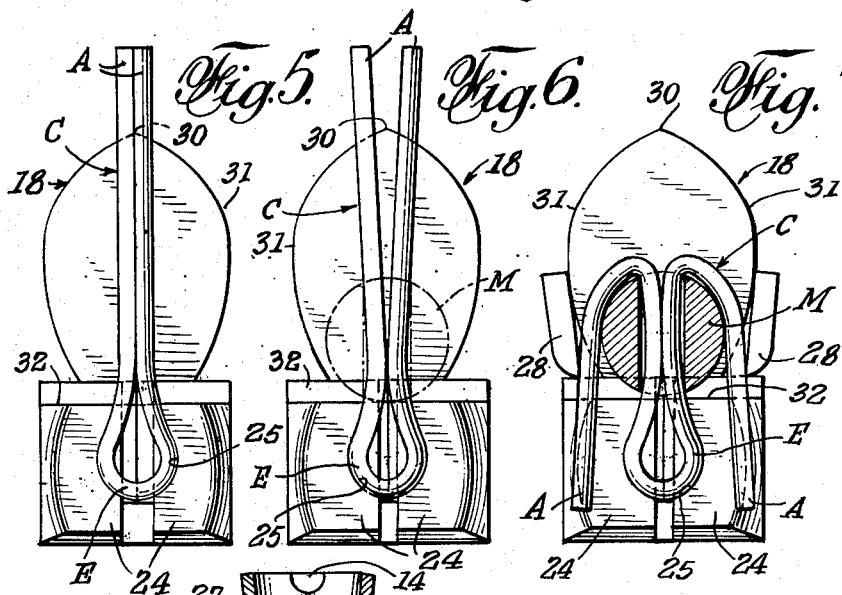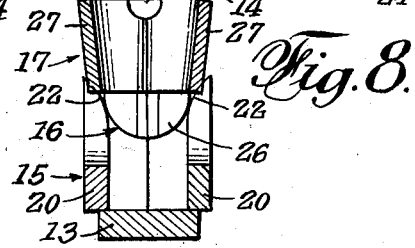

3,153,357
COTTER PIN BENDING TOOL
Robert W. Decker, 5710 Harder St., San Jose, Calif.
Filed Sept. 17, 1962, Ser. No. 224,134
3 Claims. (Cl. 81—15)

This invention relates to a tool for bending the ends of a cotter pin after the same has been inserted into a transverse hole in the end of a shaft, pivot pin or the like.

An object of the invention is to provide a tool that greatly facilitates application of a cotter pin in operative position, simplifying both the insertion operation and the operation for bending the pin ends.

Another object of the invention is to provide a cotter-applying tool that will apply cotter pins that are difficult to spread for various reasons, among which is the squared-end form of the pin ends or arms.

A further object of the invention is to provide a tool of the character above indicated that includes novel and simple means for effecting an initial spreading of the pin ends, thereby insuring that said ends are thereafter bent with easy facility and thereby speeding up a cotter pin setting operation.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawings. However, said drawings merely show, and the following description merely describes, one embodiment of the present invention, which is given by way of illustration or example only.

In the drawings, like reference characters designate similar parts in the several views.

FIG. 1 is a side elevational view of a tool according to the present invention preparatory to applying a cotter pin.

FIG. 2 is a similar view, partly broken away, showing said tool after the cotter pin has been applied thereby.

FIG. 3 is an enlarged and broken plan view of the tool as in FIG. 1.

FIG. 4 is a similar view of the tool as in FIG. 2.

FIG. 5, to an increased scale, is an end view of the applying end of the tool in the position thereof for receiving a cotter pin to be applied.

FIG. 6 is a similar view showing said tool end in the pin-end spreading position thereof.

FIG. 7 is a similar view showing said tool end at the completion thereby of a pin-applying operation.

FIG. 8 is a cross-sectional view as taken on the line 8—8 of FIG. 4.

The tool that is illustrated comprises, generally, plier handles 10 and 11 connected by a pivot 12 and, respectively, provided with arms 13 and 14 on the opposite side of said pivot from said handles, said arms being offset at an angle with respect to the arms; means 15 carried by the arm 13 to receive a cotter pin C; means 16 provided on the arm 14 to cause actuation of the means 15 to so grip the eye E of a cotter pin received by said means as to cause the pin arms or ends A to spread upon initial closing movement of said handles 10 and 11 toward each other; resilient means 17 extending from the end of arm 14 for entering between the spread cotter pin arms to further spread the same during continued closing movement of the tool handles; and a wedge cam 18 carried by the arm 13 to wedge the means 17 apart during the final portion of the closing movement of the tool handles to cause the mean 17 to wrap or bend the pin arms A oppositely around the sides of the member M to which the pin is applied, the pin arms being in approximate parallelism with the portion of the cotter that is disposed in the hole in the member M into which the pin is fitted. The handles 10 and 11 are preferably spread by a spring 19, carried by one of them, the operation of the tool being effected against the bias of said spring.

The means 15 comprises a pair of arms 20 that are connected by a pivot 21 carried by the tool arm 13 and are superimposed on said latter arm, the rearward ends of said arms being provided with rounded upper edges 22. Flat springs 23, on opposite sides of the tool, are carried by the handle 10 and bias said arms 20 toward each other, as indicted in FIG. 3. Each arm 20, on the outer side of pivot 21, is extended to form a pin-eye engaging end 24, said ends being normally spaced apart, as in FIGS. 3 and 5. Said ends 24 are provided with complementary seat portions 25 for receiving the eye E of a cotter pin, as can best be seen in FIG. 5, said pin being slipped into the seat from the end and disposed with its arms A extending upwardly normal from the arm ends 24.

The means 16, best seen in FIG. 8, comprises a wedge cam 26 that is normally between and above the arms 20 where the same are provided with the rounded edges 22. FIG. 8 shows the cam 26 in a position intermediate the full open and full closed positions of FIGS. 1 and 2, said view showing partial spread of the arms 20 relative to the width of the tool arm 13.

Upon initial gripping of the tool by its handles 10 and 11 and pressing the same together, the wedge cam 26 moves partly between the ends of arms 20 and spreads said arms against the bias of springs 23 to draw the arm ends 24 toward each other, thereby not only tightly gripping the pin eye E but so laterally compressing the same as to cause the pin arms A to spread apart, as in FIG. 6.

The resilient means 17 as shown as a pair of spring arms 27 that, as shown in FIG. 3, are normally biased toward each other so that the inwardly and downwardly angled ends 28 form a V with it apex 29 centered with respect to a cotter pin C in the seat 25. Rearward of said apex 29, the spring arms 27 are spaced, as can be seen in FIG. 3. It will be clear that as the tool handles are brought closer together, said apex 29 will enter the space between the pin arms A.

The wedge cam 18 is centered so that its upper edge 30 enters the space between the spring arms 27. Thus, as the tool handles are further pressed together, as in FIG. 2, the arms 27 are spread apart, thereby causing the angled ends 28 thereof to spread. As the arms 27 ride over the sides 31 of the cam 18, said ends first further spread the pin arms A and then bend them over the opposite sides of the member M to which the cotter pin has been applied before the arms A of the latter have been spread. Thus, as shown in FIG. 7, the cotter pin is effectively applied and cannot be accidentally displaced.

It will be seen from the several views that the arm ends 24 are provided with flat faces 32 which bear against the end of member M during setting of the cotter pin, thereby enabling the user to hold the tool steady during operation thereof.

Upon release of the handles 10 and 11, the spring 19 returns the tool to spread condition, thereby enabling removal of the tool from the set cotter pin and readying the same for a repeat operation, as above described.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A cotter pin setting tool comprising
   (a) two pivotally connected arms provided with handles for moving them toward each other and a spring for separating them,
   (b) means carried by one of said arms to hold the eye of a cotter pin with the arm ends of the pin extending substantially normal to the latter arm,
   (c) means on the other of said arms to laterally compress the sides of the pin eye to secure the same and to spread said pin arms apart during initial movement of the tool arms toward each other,
   (d) resilient means carried by said latter arm for entering between the spread pin arms to further spread them during continued movement of the tool arms toward each other, and
   (e) a cam carried by said one arm to spread the resilient means during the final portion of the movement of the tool arms toward each other to cause the resilient means to bend the cotter pin arms back to positions on opposite sides of the cotter pin eye.

2. A cotter pin setting tool according to claim 1 in which the pin-holding means comprises two pivotally connected arm ends provided with complementary portions of a seat in which said cotter pin eye is disposed.

3. A cotter pin setting tool according to claim 1 in which the resilient means comprises a pair of spring arms with free ends that are resiliently biased toward each other and directed to form a V end enterable in the space between the cotter pin arms.

References Cited in the file of this patent
UNITED STATES PATENTS

| | | |
|---|---|---|
| 545,374 | Nelson | Aug. 27, 1895 |
| 1,516,877 | Anekee | Nov. 25, 1924 |
| 2,802,383 | Babyak | Aug. 13, 1957 |
| 2,821,100 | Decker | Jan. 28, 1958 |
| 2,854,874 | Decker | Oct. 7, 1958 |
| 3,041,729 | Tofflemire | July 3, 1962 |